(12) United States Patent
Johnston et al.

(10) Patent No.: US 9,403,702 B1
(45) Date of Patent: Aug. 2, 2016

(54) COMMODITY WATER PURIFIER

(71) Applicants: Arthur W. Johnston, Atlanta, GA (US);
Arthur F. Johnston, Atlanta, GA (US)

(72) Inventors: Arthur W. Johnston, Atlanta, GA (US);
Arthur F. Johnston, Atlanta, GA (US)

(73) Assignee: A BETTER LIFE WORLDWIDE, LLC, Atlanta, GA (US)

( * ) Notice: Subject to any disclaimer, the term of this patent is extended or adjusted under 35 U.S.C. 154(b) by 0 days.

(21) Appl. No.: 14/857,769

(22) Filed: Sep. 17, 2015

Related U.S. Application Data

(60) Provisional application No. 62/175,269, filed on Jun. 13, 2015.

(51) Int. Cl.
| | | |
|---|---|---|
| *C02F 1/50* | (2006.01) | |
| *C02F 1/76* | (2006.01) | |
| *C02F 1/28* | (2006.01) | |
| *B01D 39/16* | (2006.01) | |
| *B01D 39/20* | (2006.01) | |
| *C02F 1/00* | (2006.01) | |
| *C02F 1/62* | (2006.01) | |
| *B01D 46/00* | (2006.01) | |
| *C02F 103/32* | (2006.01) | |
| *C02F 103/00* | (2006.01) | |

(52) U.S. Cl.
CPC .............. *C02F 1/50* (2013.01); *B01D 39/1692* (2013.01); *B01D 39/2062* (2013.01); *B01D 46/0023* (2013.01); *C02F 1/003* (2013.01); *C02F 1/281* (2013.01); *C02F 1/283* (2013.01); *C02F 1/62* (2013.01); *C02F 2103/003* (2013.01); *C02F 2103/008* (2013.01); *C02F 2103/32* (2013.01); *C02F 2303/04* (2013.01); *C02F 2303/24* (2013.01); *C02F 2307/10* (2013.01)

(58) Field of Classification Search
CPC .......... C02F 1/003; C02F 1/281; C02F 1/283; C02F 1/50; C02F 1/62; C02F 1/76; C02F 2103/003; C02F 2103/008; C02F 2103/32; C02F 2303/04; C02F 2303/24; C02F 2307/10; B01D 39/1692; B01D 39/2062; B01D 46/0023
See application file for complete search history.

(56) References Cited

U.S. PATENT DOCUMENTS

| | | | |
|---|---|---|---|
| 6,241,994 B1 * | 6/2001 | Lee ........................ | A01N 43/78 424/404 |
| 2009/0191250 A1 * | 7/2009 | Gooch ...................... | C02F 1/50 424/405 |
| 2011/0086078 A1 * | 4/2011 | Gooch .................... | C02F 1/004 424/402 |

FOREIGN PATENT DOCUMENTS

CN        102772396 A  * 11/2012

OTHER PUBLICATIONS

Derwent abstract of CN 102772396A (2014).*
Machine translation of CN102772396A, espacenet.com (obtained Feb. 2016).*

* cited by examiner

*Primary Examiner* — Lucas Stelling
(74) *Attorney, Agent, or Firm* — F. Russell Denton; Denton Intellectual Property Law Firm, LLC

(57) ABSTRACT

The invention provides systems and methods for purification of fluids such as water and air. The fluids are passed through a filter comprising chlorhexidine citrate (CXC), wherein either in the same filter or downstream from it a sorbing mixture of porous calcium phosphate, calcium carbonate and activated carbon is also provided. The invention enables rapid, economical fluid purification without byproducts. The materials can be regenerated for reuse, and the invention can be used for either high volume applications or disposable single-use applications.

18 Claims, No Drawings

COMMODITY WATER PURIFIER

RELATED APPLICATIONS

This invention derives priority from a provisional US patent application having the same title and inventors, U.S. Ser. No. 62/175,269, filed Jun. 13, 2015.

FIELD OF THE INVENTION

This invention relates to fluid purification filters and devices, particularly for removal of microbial contaminants from aqueous media and from gases.

BACKGROUND

Purification of fluids such as water and air are important objectives for public health, yet they pose ongoing challenges due to the need to balance of cost, convenience and effectiveness. As to cost, water and air are necessary for life, but populations at the lower end of the socioeconomic scale cannot support high retail costs for treated fluids, moreover purifier operating costs must be still lower to make them sustainable for either public or private providers. As to convenience, purifiers must require a minimum of maintenance, replacement and downtime. And as to effectiveness purifiers must provide essentially fail-proof service for long periods under a wide variety of operating conditions.

Uses of purification range from potable drinking water to fermentation media and separation of components in biological fluids. Likewise sanitizing purification of (re)circulated air in homes, offices, hospitals, clean rooms, air- and spacecraft are important application for filtration media. Thus air filtration products such as HEPA filters are popular to remove particulates such as dust, mold, allergens, and other material from the air. Among the numerous applications for materials that can remove and/or immobilize microbes, fermentation and other biotech processes are particularly important at present.

Existing water- and air purification methods are diverse, including distillation, reverse osmosis, ion-exchange, chemical adsorption, coagulation and filtering or retention (physical occlusion of particulates). Chemical methods include the use of reagents to oxidize, flocculate or precipitate impurities. The range of particle size exclusion depends on the size of pores or interstitial spaces in membranes and granular materials, respectively. Other methods use purification materials that react chemically with contaminants. Generally complete purification requires multiple complementary techniques, thus it is common to employ several devices in series, each with a different function. Illustrative of complementary methods are mixed resins to remove negatively and positively charged species, and charge-neutral species.

The need for extensive processing and special apparati add to the cost, energy inefficiency and technical sophistication of these methods. And the most economical techniques have been insufficiently effective against microbial contaminants such as bacteria and viruses. Membranes to remove components in the cellular size range are relatively costly, but the alternative is the use of strong oxidizers such as bleaches, halogens, reactive oxygen species such as ozone, and the like.

The minimum standards of the Environmental Protection Agency (EPA) for accepting antimicrobial water purification devices require a 6-log reduction at minimum (99.9999%) for common coliforms, represented by the bacteria *E. coli* and *Klebsiella terrigena*, for samples in which they are present at $1 \times 10^7$ (cells)/100 mL For devices for which common virus removal is claimed, as represented by process-resistant poliovirus 1 (LSc) and rotavirus (Wa or SA-11), the EPA's minimum standard for devices is a 4-log reduction, 99.99% of cells, from an $1 \times 10^7$ (cells)/L influent. Common cysts (protozoa), as represented by *Giardia muris* or *Giardia lamblia*, cause diarrhea, are difficult to treat medically, are widespread, and resist chemical disinfection. For devices that are claimed to remove cysts the EPA's minimum standard is a 3-log reduction, 99.9% of cysts removed, from $1 \times 10^6$ (cells)/L or $1 \times 10^7$ (cells)/L influent. The EPA has allowed the use of inanimate particles of comparable size to substitute for disease cells for purposes of testing devices to show satisfaction of these criteria.

Simple size exclusion and or aggressive oxidation can render fluids safe from microbes and organic toxins, but that is less true for dissolved inorganic toxins. Dissolved inorganic substances include metals, among which are the heavy metals. Thus for instance aluminum, arsenic ((V) and/or the more toxic (III)), copper iron, lead and zinc are commonly found in water, as is in some cases uranium. The uptake of these metals by filters is a function of charge state, pH, contact time and initial concentration. Common methods to remove them from, for example wastewater include chemical precipitation, membrane separation, osmosis, ion-exchange resins, solvent extraction, chemical redox reactions, coagulation and sorption; there is some overlap between these categories. Cost and efficiency are often key factors in choosing a purification protocol for this category of impurities. But in any case these impurities are an ongoing problem both because of their ubiquity and because they are subject to upper concentration limits that have been steadily reduced by regulatory and legislative bodies. Indeed the least amount that can be measured has been used in some rules as the threshold at which the presence of the metal is deemed excessive. Moreover there is commonly a need to remove metals from water due not to their toxicity but to their contribution to its hardness and the resulting unattractive and sometimes clogging deposits that they leave in their wake.

Thus there is an ongoing need for simple, inexpensive fluid purification and filtration methods and devices that can remove particulates, cells and dissolved inorganic species. There is a further need in the art for methods and devices that meet and significantly surpass the minimum EPA specifications for microbe-eliminating water purifiers suitable for consumer and/or industrial point-of-use applications.

BRIEF DESCRIPTION OF THE INVENTION

The invention provides systems and methods for purification of fluids such as water and air. In one embodiment the invention provides a chlorhexidine citrate (CXC) in a porous configuration for use in water purification, wherein effluent from the CXC passes through rigorous filtration; in a particular embodiment the rigorous filtration captures particles ≥0.2 microns in size. In another particular embodiment the invention provides a chlorhexidine citrate (CXC) in a porous configuration in a first module, wherein fluid may be passed serially through first the CXC module and then through a second filter module. In a particularly useful embodiment the second filter module is comprised of a mixture of a calcium phosphate compound, calcium carbonate and a carbon material and has a pore size in the rigorous filtration range. HA derived from bone charcoal is useful for this purpose, however synthetic combinations are more desirable in some cases for marketing reasons. In an alternative embodiment all four of the CXC, a calcium phosphate compound, calcium carbonate and activated carbon are provided in mixed form. In a further embodiment the CXC and a calcium phosphate compound, calcium carbonate and activated carbon are provided in a drinking straw and are configured separately in an inline filtration sequence or in a composite porous matrix. In yet another embodiment the filtration employs CXC, a calcium phosphate compound, calcium carbonate and activated carbon and apatite in combination or in any subcombination thereof, or otherwise employs porous apatite downstream from a first module comprising CXC.

In a particular embodiment the invention provides a method for filtering an influent to remove any microorganisms therefrom, comprising causing the influent to flow through a first purification material comprising a chlorhexidine citrate (CXC) and through a second purification material that is a rigorous filtration medium comprising a calcium phosphate compound, calcium carbonate and activated carbon, thereby obtaining filtered fluid, wherein:
  a) the influent flows through the first purification material before flowing through the second purification material;
  b) the first and second purification materials are each in porous form;
  c) the amount of CXC present is sufficient to accomplish at least one of the following:
    i) a 6-log reduction in coliform bacteria *Escherishia coli* or *Klebsiella terrigena* for samples having $1 \times 10^7$ organisms/100 mL influent;
    ii) a 4-log reduction in process resistant viruses poliovirus 1 (LSc) or rotavirus (Wa or SA-11) for samples having $1 \times 10^7$ organisms/L influent;
    iii) a 3-log reduction in cysts *Giardia muris* or *Giardia lamblia*, for samples having a concentration in the range of $1 \times 10^6$ to $1 \times 10^7$ organisms/L influent; or
    iv) removal of inanimate particles of comparable size to any of those organisms to the same corresponding extent of multi-log reduction; and
  d) the filtered fluid is essentially free of CXC.

In another particular embodiment the invention provides a method for filtering an influent to remove any microorganisms therefrom, comprising causing the influent to flow through a first purification material comprising a chlorhexidine citrate (CXC) and a second purification material comprising a calcium phosphate compound, calcium carbonate and activated carbon, thereby obtaining filtered fluid, wherein:
  a) the first and second purification materials are intermingled with one another in a composite form or the fluid flows through the first purification material before flowing through the second purification material;
  b) the first and second purification materials are each in porous form;
  c) the amount of CXC present is sufficient to accomplish at least one of the following:
    i) a 6-log reduction in coliform bacteria *E. coli* or *Klebsiella terrigena* for samples having $1 \times 10^7$ organisms/100 mL influent;
    ii) a 4-log reduction in process resistant viruses poliovirus 1 (LSc) or rotavirus (Wa or SA-11) for samples having $1 \times 10^7$ organisms/L influent;
    iii) a 3-log reduction in cysts *Giardia muris* or *Giardia lamblia*, for samples having a concentration in the range of $1 \times 10^6$ to $1 \times 10^7$ organisms per L influent; or
    iv) removal of inanimate particles of comparable size to any of those organisms to the same corresponding extent of multi-log reduction; and
  the filtered fluid is essentially free of CXC.

In another embodiment the invention provides a mixed material for treating a fluid to remove any microorganisms therefrom, comprising a combination of a chlorhexidine citrate (CXC), a calcium phosphate compound, calcium carbonate and activated carbon, wherein:
  a) the material is in porous form;
  b) the amount of CXC present is sufficient to accomplish at least one of the following when a flow of contaminated water is passed through the mixed material:
    i) a 6-log reduction in coliform bacteria *E. coli* or *Klebsiella terrigena* for samples having $1 \times 10^7$ organisms/100 mL influent;
    ii) a 4-log reduction in process resistant viruses poliovirus 1 (LSc) or rotavirus (Wa or SA-11) for samples having $1 \times 10^7$ organisms/L influent;
    iii) a 3-log reduction in cysts *Giardia muris* or *Giardia lamblia*, for samples having a concentration in the range of $1 \times 10^6$ to $1 \times 10^7$ organisms per L influent; or
    iv) removal of inanimate particles of comparable size to any of those organisms to the same corresponding extent of multi-log reduction; and
  c) the mixed material retains essentially all of the CXC when a flow of contaminated water is passed through the mixed material.

In a further embodiment the invention provides a device for filtering a fluid to remove any microorganisms therefrom, comprising a housing, a first purification material comprising a chlorhexidine citrate (CXC) and a second purification material comprising a calcium phosphate compound, calcium carbonate and activated carbon, wherein:
  a) the housing comprises:
    i) the first and second purification materials in a mixed form, held in a porous medium that permits fluid flow into and out of the mixed materials; or
    ii) the first purification material in a first module in line with and downstream from a second module within which is provided the second purification material, and each of the two modules is held within the housing in a respective porous medium that permits fluid flow into and through the first module, on to the second module, and to exit from the second module;
  b) the first and second purification materials are each in porous form;
  c) the amount of CXC present is sufficient to accomplish at least one of the following:
    i) a 6-log reduction in coliform bacteria *E. coli* or *Klebsiella terrigena* for influent samples having $1 \times 10^7$ organisms/100 mL influent;
    ii) a 4-log reduction in process resistant viruses poliovirus 1 (LSc) or rotavirus (Wa or SA-11) for influent samples having $1 \times 10^7$ organisms/L influent;
    iii) a 3-log reduction in cysts *Giardia muris* or *Giardia lamblia*, for influent samples having a concentration in the range of $1 \times 10^6$ to $1 \times 10^7$ organisms per L influent; or
    iv) removal of inanimate particles of comparable size to any of those organisms to the same corresponding extent of multi-log reduction for influent samples; and
  d) the second purification material is present in an amount and arrangement that is sufficient to essentially completely prevent loss of CXC by erosion during passing through of influent.

DETAILED DESCRIPTION OF THE INVENTION

Definitions

The following definitions clarify the scope and use of the invention including for compositions, devices and processes employing the invention.

The terms "chlorhexidine" has its usual and ordinary meaning in the art; chlorhexidine is abbreviated herein as CX. The terms "chlorhexidine hydrate" and "CXH" refer to chlorhexidine that has some number of waters of association, irrespective of whether the value of that number is an integer, fraction or other number. The term "chlorhexidine salt(s)" refers to chlorhexidine that is associated with a counterion; generally but not always such salts are acid salts wherein the chlorhexidine is positively charged due to bonding with one or more acidic protons and the counterion is an anion.

The terms "chlorhexidine citrate(s)" and "CXC" refer to citric acid salts of chlorhexidine, i.e., having a formula $C_{22}H_{30}N_{10}Cl_2 \cdot n(C_3H_5O(COOM)(COOM')(COOM''))$, where n is the number of citric species per chlorhexidine molecule and each of M, M' and M" is hydrogen and/or a metal atom, and the metal atom may be mono-, di- or trivalent. In some embodiments M, M' and/or M" is a metal atom that is di- or trivalent and is a counterion for more than one carboxylic moiety, whether on the same or different citrate molecules. Note that n varies and may be a fraction either less than or greater than 1, or may be an integer such as 1, 2, or higher, or n may be a decimal value that corresponds to neither an integer nor a fraction.

The term "influent" refers to a fluid that is directed through a filtering medium. The term "influent flow" with respect to a purification material means the passage of influent through that material.

The terms "filter" and "filtering" have their ordinary and common meaning in water filtration, and include but are not limited to the removal of microorganisms and other impurities from water intended for use by humans. The term "filtration medium" means a composition of matter from which a filter is constituted.

The term "filtered fluid" means a fluid that has been passed through a purification material according to the invention.

The term "fluid" means a liquid, a gas, or a combination thereof. The fluid optionally has solutes dissolved therein or has a suspension of small solids. In some embodiments the fluid comprises one or a combination of liquids: water, an aqueous solution, a mixture primarily comprising water and ethanol, blood, a bodily fluid other than blood, (microbial) fermentation broth, and mixtures thereof. In additional embodiments the fluid comprises one or a combination of gases: air, oxygen gas, nitrogen gas, carbon dioxide, argon gas, nitrous oxide, an anesthetic gas other than nitrous oxide, and mixtures thereof. Where the fluid is an aqueous medium, in certain embodiments it is one or a combination of: potable water, a beverage, a recycle stream in a chemical process, a recycle stream in a cell culturing process, an aqueous solutions that has been used in a surgical procedure, and mixtures thereof.

The term "fluid flow" means the motion of fluid, which may be passive as under the force of gravity or capillary action, or may be forced by a pump or vacuum or other mode of flow. The term "fluid flow into and out of," as used with respect to materials, refers to permeation of the fluid through such materials. The term "in line with" as used with respect to such flow through a component means that the flow passes serially through stages, and that the referenced component receives it at one stage and that the flow subsequently exits from the component.

The term "microorganism" has its usual and ordinary meaning in the biological and medical sciences, and includes but is not limited to bacteria, viruses, protozoa, prions, molds, single- and multi-celled algae, and single- and multi-celled yeasts and other fungi.

The term "purification material" means a composition having the purpose of removing microorganisms or inanimate matter from an influent by means of mechanical size exclusion, physical adsorption to a surface, chemical absorption into the composition, chemical reaction with the composition, or other means. The term "binder" as used with respect to purification materials means a substance that acts to hold together solids composed of such materials. The terms "porous block" and "porous sheet" as used with respect to purification materials refer to compositions in which channels of some size exist within solid blocks or sheets. Such blocks or sheets may be rigid, or alternatively may be flexible, or any combination or gradient thereof.

The term "porous form" as used with respect to a purification material means that the material has pores of a suitable size and population density to enable the material's use as a rigorous filtration medium.

The term "rigorous filtration" is used in a broad sense herein with regard to the size of excluded molecules, cells and inanimate particles. It includes microfiltration (excluding by size, with a lower cut-off range of 0.1 to 10 microns, or above $10^6$ Da); dialysis methods and ultrafiltration (molecular weight cut-off in the range of $10^3$ Da to $10^6$ Da); nanofiltration (excluding molecules with a lower size range of 1 to 10 nm); osmosis; reverse osmosis (excluding even smaller particles but not smaller particles); and the like. In various embodiments the threshold for exclusion by size is selected from one of the following ranges: 10 microns, 1 micron, 0.1 micron, $10^6$ Da, $10^5$ Da, $10^4$ Da, $10^3$ Da, $10^2$ Da, $10^1$ Da, 10 nm and 1 nm. In particularly useful embodiments the rigorous filtration is at the level of ultrafiltration, or excludes particles ≥0.2 microns in diameter, but the invention is not so limited. The term "rigorous filtration medium" means a composition of matter from which a filter is constituted by which rigorous filtration is performed.

The term "calcium phosphate compound" means a compound comprising both calcium and phosphate. Calcium phosphates useful for the present invention include calcium ($Ca^{2+}$) salts of orthophosphates ($PO_4^{3-}$), metaphosphates ($PO_3^-)_{n \geq 1}$ and pyrophosphates ($P_2O_7^{4-}$), whether as pure salts or as mixed salts with hydrogen ions ($H^+$) or hydroxide ions ($OH^-$). Particularly useful calcium phosphates for the present invention are tricalcium phosphate [$Ca_3(PO_4)_2$] and hydroxyl(l)apatite [$Ca_{10}(PO_4)_6(OH)_2$, sometimes denoted as $Ca_5(PO_4)_3(OH)$], especially when any of them is incorporated in a proportion of 57-80 mass % relative to the whole of inorganic species, however the invention is not so limited. In some embodiments the calcium phosphate compound is derived from bone char; in other embodiments that compound is not. In certain embodiments the compound is selected from the group consisting of monophosphates, diphosphates, triphosphates, octaphosphate, metaphosphates, and combinations thereof. In various embodiments the compound is an apatite having the formula $Ca_{10}(PO_4)_6(X)_2$, where X represents one or more of hydroxyl, fluorine, chlorine, bromine, iodine and carbonate. In certain embodiments one or more phosphate moieties in the calcium phosphate compound is fully or partially acidized, i.e., the respective moiety has the formula $PO_4H_{n \leq 3}$.

The term "calcium carbonate" has its usual and ordinary meaning in the chemical arts, and refers to the compound $CaCO_3$.

The term "activated carbon" has its usual and ordinary meaning in the filtration arts, and refers to porous carbon having a high surface area, e.g., ≥500 $m^2/g$, available for adsorption or chemical reactions. In some embodiments activated carbon is derived from charcoal, and in others from biochar, however the invention is not limited by the source of the activated carbon or the amount of its surface area. In certain embodiments the carbon has received further chemical treatment after charring.

The terms "bone char" and "bone charcoal" have their usual and ordinary meaning, and refer to compositions obtained by heating animal bones at high temperature under fully or partially anaerobic conditions. The term "derived from" as used with respect to substances from bone char or bone charcoal means that the respective substances are bone char, bone charcoal or are isolated from or otherwise obtained from bone char or bone charcoal.

The term "sufficient to accomplish", when used in reference to an amount of CXC reducing the number of microorganisms or inanimate particles per quantity of influent to any particular extent, means that upon exposure of such quantities of influent to that amount of CXC, the respective microorganisms or particles are removed to at least that extent.

The terms "6-log reduction", "4-log reduction" and "3-log reduction", when used in reference to numbers of organisms or particles per volume unit of influent, mean that after purification the fluid has, respectively 0.0001%, 0.01% and 0.1% of the number of such organisms or particles as were present in the influent prior to purification. The term multi-log reduction means a reduction by more than one order of magnitude, i.e., reduction in quantity by more than one power of ten. The term "reduced" as used with reference to an impurity concentration in a filtered fluid, means by comparison to that impurity's concentration in the influent prior to purification. The term "organism", as used with respect to log reductions, means an undesirable biological organism in the influent. The units L and mL (or ml) are liter and milliliter, respectively.

The scientific names for microorganisms and their lifecycle states have their usual and ordinary meaning in the fields of medicine, microbiology, water purification; and health and sanitation. These include but are not limited to: coliform bacteria; *Escherishia coli*; *Klebsiella terrigena*; process resistant viruses; poliovirus; rotavirus; cysts; *Giardia muris*; and *Giardia lamblia*.

The term "inanimate particle" means a particle that is comprised of non-living matter. Examples include but are not limited to dead cells; portions of dead cells; inorganic debris; and organic content that is not composed of biological tissue. The term "comparable size", as used when comparing inanimate particles to microorganisms, refers to the size of the inanimate particles relative to the size of the respective microorganisms.

The term "essentially free of", as used with respect to CXC or any other substance, means that the amount of the respective substance present is present in at most only trace quantities. In various embodiments the amount is below 0.0001%, is undetectable, is below a threshold established by a governmental agency, or has essentially no observable effect in vitro or in vivo.

The term "diameter" as used with respect to lower thresholds for the size of cells and other particles captured by a filtration medium has its usual and ordinary meaning in size exclusion chromatography.

The term "regeneration" as used with respect to purification materials refers to treatment by which their purification capacity is recaptured in whole or in part. Non-limiting illustrative examples of regeneration means include sterilization protocols comprising at least one of elevated temperature, elevated pressure, radiation, a chemical oxidant, a chemical reductant, electrochemical treatment, or a combination thereof.

The term "intermingled" as used with respect to a plurality of purification materials means that they have been combined in an intimate mixture. The term is not limited to homogeneous mixtures; the intimate mixtures may optionally have heterogeneous character.

The terms "mixture" and "admixture" are used interchangeably herein, and refer to physical combinations to the extent that the components retain their original chemical identities. Non-limiting illustrative mixtures include blends, solutions, suspensions and colloids.

The term "composite form" refers to a mixture, and in particular a mixture of solids.

The term "dissolved" refers to a component that is physically dispersed essentially completely in a surrounding medium. Examples of inorganic impurities dissolved in influent include but are not limited to: trivalent arsenic, pentavalent arsenic, hydrogen sulfide, iron, copper, zinc, lead, aluminum, chromium, uranium or a combination thereof.

The term "present in a form that can adsorb a dissolved metal substance from the influent", as used with respect to a compound, means that when such a compound is exposed to influent the compound is capable of adsorbing on its surface or absorbing into its bulk a metal in neutral, ionic or compound form that is present in the influent, thereby removing the respective metal from the influent to that extent.

The term "amorphous" has its usual and ordinary meaning in chemistry and materials science.

The term "porosity," when used in reference to pore sizes, refers to the average diameter of the pores. Purification materials comprising a calcium phosphate compound and having pore sizes in the range of 200-800 microns in diameter are particularly useful according to the invention, but the invention is not so limited.

The term "inorganic" has its usual and ordinary meaning in chemistry. As used herein the term inorganic includes but is not limited to calcium phosphate compounds, calcium carbonate, activated carbon, trivalent and pentavalent arsenic, hydrogen sulfide, iron, copper, zinc, lead, aluminum, chromium, and uranium.

The terms "impurity" and "contamination" are used interchangeably and mean an undesirable organism or other undesirable substance, whether in dissolved or undissolved form in an influent.

The term "sterilization conditions" refers to sanitation protocol conditions by which microorganisms in influent are killed. The term "stable under sterilization conditions" as used with respect to a binder for filtration media means that the binder remains substantially intact and functional as a binder when exposed to such conditions.

The terms "particles" and "fibers" have their usual and ordinary meaning in materials science.

The term "housing" has its usual and ordinary meaning for devices, and means a surrounding structure for components. The terms "inlet" and "outlet" refer to portals for the ingress and egress of fluid through the housing, respectively. The term "contacting chamber", when referenced as being disposed between an inlet and an outlet, means that the flow passes through such chamber while within the housing.

The term "drinking straw" means a tube by means of which water or a beverage may be sucked from a reservoir such as cup or other container.

The term "residence" refers to a structure within which one or more persons live. The term "office" refers to a structure within which one or more persons work. The term "production facility" refers to a structure within which one or more persons or machines generate products. The terms "hospital", "cruise ship" and "water treatment plant" have their usual and ordinary meaning in common use.

To be effective as a general water purifier a device or process must do three things successfully: (1) kill and/or remove essentially all microbial cells; (2) remove toxic metals; and (3) remove organic species. Commonly approaches that are effective for one objective in that combination may create problems for another of its objectives. An example is in use of biocides.

Chlorhexidine (CX) is a broad-spectrum biocide that acts against both gram-positive and gram-negative bacteria, as well as against fungi by a comparable mechanism. As a positively charged molecule CX binds to negatively charged cell wall sites, where it destabilizes them and interferes with osmosis across the cell envelope. Uptake of CX into the cells is rapid, typically within 20 seconds. At low CX concentrations cell walls are compromised, which can also have an inhibitory bacteriostatic effect because it inhibits microbial adherence to surfaces and thus prevents formation of biofilms. At higher concentrations the cytoplasmic semipermeable inner membrane is also damaged, resulting in leakage and cell death. At even higher CX concentrations the cytoplasm congeals or solidifies. The formal name of CX is N,N''''1,6-Hexanediylbis[N'-(4-chlorophenyl)(imidodicarbonimidic diamide)]; its formula is $C_{22}H_{30}Cl_2N_{10}$ and its structure is shown below.

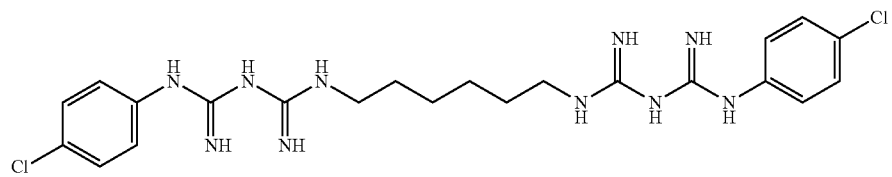 [SMILES: N=C(NCCCCCCNC(=N)NC(=N)Nc1ccc(Cl)cc1)NC(=N)Nc1ccc(Cl)cc1]

The biocidal activity of CX is both broader and faster than for antibiotics, and in vitro can kill virtually all gram-positive and gram-negative bacteria within 30 seconds. Because most microbe categories are destroyed the risk for developing opportunistic infections is low. CX has also shown effectiveness against bacterial spores, protozoa, and enveloped viruses such as HSV, HIV, CMV, RSV and influenza. Because CX binds to proteins, for instance on skin, mucosa, mouth tissue and teeth, its activity persists there for long periods (e.g., ≥48 hours), yet unlike agents such as povidone-iodine its efficacy is not undermined by body fluids such as blood.

Although the biological properties of CX are valuable its engineering properties are somewhat challenging. CX is practically insoluble and its melting point is high, being 134° C., both attributes of which are useful. However CX is crystalline, and becomes impermeable when formed into a filter. The impermeability renders the filter properties moot. And even if the filter properties remained intact, the presence of CX in effluent would raise the standard for registration with the EPA and for management of the effluent.

In an effort to resolve that problem, U.S. Pat. No. 7,427,409 discloses use of a hydrate, i.e., CX having 1.3 water molecules per chlorhexidine molecules, and the composition is an amorphous material from which a permeable filter can be manufactured. Like CX, CXH is essentially insoluble in water despite the waters of hydration; but CXH has a lower melting point, e.g., in the range of 92.4° C. The present invention contemplates use of CXH for any value of n for waters of hydration. However the inventors have discovered an unexpected disadvantage of CXH, namely that a small amount of CXH is eroded from the amorphous solid when fluid passes over or through it and thus exits with the effluent. Any water purifier that allows such emissions must be registered with the EPA as a pesticide, as opposed to a purifier; moreover the maker and/or marketer of the filter would be responsible for the ultimate fate and effects of the CXH after it leaves the filter. Moreover CXH decomposes when heated, and the water of hydration evaporates at 96° C. The inventors have discovered that chlorhexidine citrate (CXC) is a preferable alternative for several applications, due to its low solubility, lower cost than CXH, and higher melting temperature than CXH. Conveniently filtration membranes are sufficient to capture essentially all of the CXC removed by the passage of water through filters comprising CXC. An illustrative range for such filters is to capture all particles ≥0.2 microns in size. A brief survey of prior work on water purification with CX and simple derivatives follows.

U.S. Pat. Pub. No. 2008-0272062 (Gooch et al, Nov. 6, 2008) discloses a pass-through fluid treatment device within which is secured a broad-spectrum antimicrobial material such as a biguanide hydrate such as chlorhexidine hydrate.

U.S. Pat. Pub. No. 2008-0306301 (Gooch et al., Dec. 11, 2008) discloses a composition for use in treating water, air and other fluids. The composition includes a biguanide dihydrate compound, such as a hydrate of chlorhexidine, which exhibits broad spectrum antimicrobial activity.

U.S. Pat. Pub. No. 2009-0191250 (Gooch et al., Jul. 30, 2009) discloses composite materials with broad spectrum antimicrobial properties for fluid treatment. The materials may include combinations of activated carbon and with particles of chlorhexidine hydrate, useful in fixed particle bed water treatment devices and methods.

U.S. Pat. Pub. No. 2010-0125105 (Gooch, May 20, 2010) discloses fibers and particulates comprising thermoplastic a polyolefin into which is blended 1-25 weight % antimicrobial bisguanide compound such as chlorhexidine. These materials are secured in a pass-through housing through which water may be flowed for antimicrobial purification.

U.S. Pat. Pub. No. 2011-0086078 (Gooch et al., Apr. 14, 2011) discloses fibrous antimicrobial materials for uses including water filtration. The materials are prepared from miscibly blended solids of bisguanides such as chlorhexidine with thermoplastic polymers, e.g. polyolefins. The materials are useful as extruded fibers or in the particulate form for preparing nonwoven materials. Methods for formation and use are also taught.

U.S. Pat. No. 7,427,409 (Gooch et al., Sep. 23, 2008) discloses the use of broad spectrum antimicrobial materials for fluid treatment, where the materials include biguanide hydrates and bases, in particular a hydrate of chlorhexidine, $C_{22}H_{30}C_{12}N_{10}(H_2O)$ for water purification.

The inventors have surprisingly discovered that solutes and microparticles from chlorhexidine and its hydrates and salts sorb onto mixtures of calcium phosphates, and this is not limited to formats in which the porosity of the sorbing mixture is that of ultrafiltration. This discovery permits use of those biocides in combination with sorbing mixtures to create products that are safe in use yet economical to manufacture and lawful to sell without the requirement for registration with the EPA. Such sorbing mixtures are now addressed in more detail.

The present inventors' initial discovery was that bone char behaves as a sorbing mixture for CHX and its salts and hydrates. Bone charcoal is porous and granular, and is made by charring animal bones at 700° C. under semi-anaerobic conditions. Its main constituents are: calcium phosphates (57-80 mass %), particularly tricalcium phosphate [$Ca_3(PO_4)_2$] and/or hydroxylapatite [denoted as $Ca_{10}(PO_4)_6(OH)_2$ or less commonly as $Ca_5(PO_4)_3(OH)$]; calcium carbonate ($CaCO_3$, 6-10 mass %) and activated carbon (7-10 mass %). The actual composition depends upon the bone source and the preparation process. Generally the source is cow bones, though the skull and spines are never used due to the risk of Creutzfeldt-Jakob disease (so-called "mad cow" disease). Most of the organic composition evaporates during charring and is collected separately as an oil; the rest becomes activated carbon. Where desired, bone char that has been used for filtration or sorption can be regenerated by washing out impurities with hot water and then heating the bone char at 500° C. under semi-anaerobic conditions. Bone char adsorbs several types of ions from water, including fluoride anion, as well as metals from group 12 (copper, zinc, cadmium), and other such as arsenic and lead. Due to the relatively low surface area bone char is typically much less effective at removing organics impurities from fluids.

Whereas the bones of cows and fish were particularly useful for purposes of the inventors' initial discovery; those from chicken and pigs appeared to be less effective. For instance the product BRIMAC 216 sold by Tate & Lyle Process Technology may be ground to a desired particle size, e.g., 80-325 mesh. A typical assay by weight for that materials finds 9-11% carbon, ≤3% acid-insoluble ash, ≤5% moisture, 70-76% hydroxylapatite (and/or tricalcium phosphate), 7-9% calcium carbonate, 0.1-0.2% calcium sulfate, and <0.3% iron (assumed to be in the form of $Fe_2O_3$ for purposes of calculation). That material is granular, has a total surface area of ≥100 m²/g, carbon surface area ≥50 m²/g, pore size distribution of 7.5-60,000 nm, and pore volume 0.225 cm³/g. Elements bound by this material have been reported to include Cl, F, Al, Cd, Pb, Hg (both organic and inorganic), Cu, Zn, Fe, Ni, Sr, As, Cr, Mn and certain radionuclides. Organic substances bound by this material include complex molecules, pesticides, color-forming compounds, flavorings for fluids, aromas for fluids, trihalomethane precursors, dyestuffs and tributyltin oxide. Bone charcoal may be further supplemented by adding activated carbon, binder material, ion exchange resins, synthetic or natural zeolites, diatomaceous earth, other phosphates, and oxides of metals and/or main group elements, as desired.

Bone char on the market is safe and inexpensive for ordinary use in filters, e.g., for potable liquids. Yet the use of bone products for filtration remains problematic to the extent that they carry a stigma among the public either because of limited understanding about encephalopathic diseases or because of vegan values. Moreover like many other products derived from nature, bone char varies in composition proportions from batch to batch. The present inventors have overcome these difficulties by combining analytically pure calcium phosphate(s) with calcium carbonate and activated carbon.

Calcium phosphates useful for the present invention include calcium ($Ca^{2+}$) salts of orthophosphates ($PO_4^{3-}$), metaphosphates ($PO_3^-)_{n\geq 1}$ and pyrophosphates ($P_2O_7^{4-}$), whether as pure salts or as mixed salts with hydrogen ions ($H^+$) or hydroxide ions ($OH^-$). Particularly useful calcium phosphates for the present invention are tricalcium phosphate [$Ca_3(PO_4)_2$] and hydroxyl(l)apatite, but the invention is not so limited.

As to hydroxyl(l)apatite, apatite is the generic name for a usually crystalline mineral category having the formula $Ca_{10}(PO_4)_6(X)_2$, where X is OH (in hydroxy(l)apatite), F (in fluorapatite), or Cl (in chlorapatite). Other members include X=Br (in bromapatite); and I (in iodoapatite) is theoretically possible. Where the mineral is a mixed combination of the more common of those anions, its formula is indicated as $Ca_{10}(PO_4)_6(OH,F,Cl)_2$. Hydroxylapatite is present in tooth enamel and bone; in bone X may be $CO_3$, and $PO_4H_{n\leq 3}$ substitutions may also be present. Apatite is found at concentrations of 18-40% as collophane (i.e., (sub)microscopic crystals) in phosporite sedimentary rock. Apatites may also be synthesized, such as by condensing 10 $Ca(OH)_2$ and $6H_3PO_4$ to make hydroxylapatite, or by condensing 3 $Ca_3(PO_4)_2$ and $CaF_2$ to make fluorapatite.

The present inventors have found that hydroxylapatite is effective in adsorbing enveloped viruses and removing them from solution; the inventors believe that charges on the viral capsids are responsible for that adsorption, but the invention is not so limited. Hydroxyl apatite is substantially less effective at removing or otherwise inactivating unenveloped viruses such as Rotavirus. Nevertheless the inventors have found that other forms of apatite are useful for adsorbing both enveloped and unenveloped viruses from solution.

Various features may further enhance devices that contain combinations of substances according to the invention. Certain useful embodiments employ CXC and or the inorganic substances in a zone that is sandwiched between a pair of membranes. Suitable membranes include but are not limited to Porex® permeable disks.

In certain embodiments an expandable substance is also included in the zone with CXC and or the inorganic substances. The expandable substance may be a superabsorbent material or another material that swells when wetted. In an event that introduces fluid to such zones, the expandable substance may swell to bring the zone into still more intimate contact with the membrane, and no CXC particulates exit the device. A suitable modality is taught in South African patent document 2002/8316.

In further embodiments a composition comprising CXC and or inorganic substances may be prepared in combination with an expandable substance, and may be provided in the form of a molded or extruded block. Such compositions likewise eliminate channeling and prevent particulates from exiting the device. A suitable modality is taught in U.S. Pat. No. 6,180,016; there a block is prepared from a composition comprising 97% hydroxyl apatite and 3% superabsorbent material, and the block essentially serves as a containment membrane.

Apatites have been used in various forms such as grains, particles and fibers to bind microbial cells. Generally the use of hydroxylapatite (HA) in anti-microbial water purification requires a complex process involving chemical adsorption of cells. E.g., Okamoto in U.S. Pat. No. 5,755,969, discloses the use of thin, pure fibers or whiskers of HA prepared by a unique method and isolated in a particular crystal structure. However Okamoto warns that extracted or synthesized HA generally has poor crystallinity and adsorption, and that their liquid permeability cannot be assured for purposes of removing microbes. Moreover Okamoto's reported test data shows virus reduction of at best only 99.76%. Thus it is perhaps not surprising that no known commercially available filtration or purification devices incorporate apatite or HA compounds. A brief survey of subsequent work on comparable filters follows.

U.S. Pat. No. 5,552,046 (Johnston et al., Sep. 3, 1996) discloses a staged filter removing first >99% of particulates by a filter for 0.45-0.50 micron particles, and then removing 99.9% of bacteria and cysts by means of a filter for particles ≤0.2 microns.

U.S. Pat. No. 6,180,016 (Johnston et al., Jan. 30, 2001) discloses a pass-through fluid treatment method and device where the purification material is a porous block or sheet composed of granulated bone char (hydroxyl)apatite and absorption media such as activated carbon, in a fixed binder polymer matrix.

U.S. Pat. No. 6,187,192 (Johnston et al., Feb. 13, 2001) discloses a pass-through fluid treatment method and device where the purification material is a porous block or sheet composed of granulated bone char (hydroxyl)apatite and absorption media such as activated carbon, in a fixed binder polymer matrix. U.S. Pat. No. 6,180,016 (Johnston et al., Jan. 30, 2001) discloses a method to use such devices for water purification.

U.S. Pat. No. 6,833,075 Hughes, Dec. 21, 2004) discloses a method and device to filter and/or purify aqueous fluids with microbial and chemical impurities such as metals, water treatment chemicals and reactive chemicals, by passing the fluid through a composite treatment material in rigid or flexible block or sheet form, in which at least one component has been surface treated.

U.S. Pat. No. 6,861,002 (Hughes, Mar. 1, 2005) discloses a method and device for the chemical conversion, filtration and/or purification of aqueous fluids such as water that have microbial and chemical impurities such as arsenic, chlorine, bacteria, viruses, and cysts. The where the fluid is passed through a (solid) treatment material composed of carbon, metal phosphates, metal oxides, reduced metals, metal silicates, metal sulfates, metal carbonates, and/or metal hydroxides, where the solids are held by a fixed binder matrix.

U.S. Pat. No. 6,878,285 (Hughes, Apr. 12, 2005) discloses a process for removing soluble and insoluble inorganic, organic, and microbiological contaminants from a fluid stream, in which fouling of ion exchange material is minimized by placing modules in line before and after the ion exchange component, where both the pre- and post-treatment modules are composites of bone charcoal, activated carbon and a binder.

U.S. Pat. Pub. No. 2004-0232068 (Hughes, Mar. 1, 2005) discloses a process of passing fluids through or over a composite purification material composed of non-expandable and expandable matter that swell through the absorption of fluid. U.S. Pat. Pub. No. 2006-0289349 (Hughes, Dec. 28, 2006) discloses the use of such expandable matter as a reservoir for time release of water treatment agents. U.S. Pat. No. 7,201,841 (Hughes, Apr. 10, 2007) discloses composite materials and devices for fluid modification, in which biocidal fluid treatment agents are generated, delivered or removed by the device by a component that is expanded by (i.e., absorbed and/or swelled by) a fluid treatment agent.

U.S. Pat. No. 7,186,344 (Hughes, Mar. 6, 2007) discloses a process of passing fluid through a pretreatment membrane of bone charcoal or bauxite to remove microbes and soluble and insoluble contaminants such as a manganese-based oxidizer or peroxide compound.

U.S. Pat. No. 7,383,946 (Hughes, Jun. 10, 2008) discloses use of solid materials permeated by a fluid containing high concentrations of a reactive oxidizer gas such as chlorine dioxide. This is said to allow rapid and safe transfer of high concentrations of the gas, for instance to disinfect and sanitize liquids among other media.

It will be noted that where prior art designs above concerned apatite and HA, the reagent or biocide was coated on a surface, embedded in a time-release material, or included as a component of a composite with the filter material. One of ordinary skill in the art would expect that a substance that is either dissolved or carried over as undissolved microparticles in pass-through fluid from a biocidal pretreatment filter would simply be likewise carried through the apatite or HA filter matrix and exit with the effluent. Surprisingly the inventors have discovered that is not the case for the chlorhexidine family of biocidal substances.

The invention is particularly useful. The CXC can be provided in the form of a porous aggregate or composite having a semipermeable membrane at the interface for efflux from the CXC. The semipermeable membrane for pass-through efflux from CXC may be comprised of a mixture of a calcium phosphate compound, calcium carbonate and activated carbon, or a filter constituted by such a mixture may be used inline downstream from pass-through efflux from CXC. In another configuration the mixed composite may further comprise CXC. In particularly useful embodiments the CXC is placed in a lower module within a drinking straw, and a higher module comprises a filter constituted by a mixture of a calcium phosphate compound, calcium carbonate and activated carbon, or the drinking straw comprises a mixed composite of CXC, a calcium phosphate compound, calcium carbonate and activated carbon. Likewise any of these types of configurations may be used to provide a cartridge for water treatment for use in a water supply for a residence, office, production facility, hotel, hospital, cruise ship or water treatment plant.

Naturally the amount of CXC and the relative amounts of a calcium phosphate compound, calcium carbonate and activated carbon depend upon the throughput volume needed and the specifications for time to replacement or regeneration of the purification media. A typical specification for a water purification cartridge is that relative to the throughput volume of water the cartridge contains enough material to provide ≥6-12 months of service from the cartridge when in use for water purification. In certain embodiments the CXC, calcium phosphate, calcium carbonate and activated carbon are present at 20-60 mesh size, and have powder pore sizes in the range of 200-800 microns, depending on the particle size. The inventors have also found that HA in amorphous form is particularly desirable for purposes of the invention. In particular embodiments HA and/or another apatite are present in a block or film having pore sizes in the rigorous filtration range, e.g. with 0.2 micrometer average diameter as the upper limit for passage of particles through the medium.

The embodiments of the invention as described herein are merely illustrative and are not exclusive. Numerous additions, variations, derivations, permutations, equivalents, combinations and modifications of the above-described invention will be apparent to persons of ordinary skill in the relevant arts and are within the scope and spirit of the invention. The invention as described herein contemplates the use of those alternative embodiments without limitation.

The invention claimed is:

1. A method for filtering an influent to remove any microorganisms therefrom, comprising causing the influent to flow through a first purification material comprising a chlorhexidine citrate (CXC) and through a second purification material that is a rigorous filtration medium comprising a calcium phosphate compound, calcium carbonate and activated carbon, thereby obtaining filtered fluid, wherein:

a) the influent flows through the first purification material before flowing through the second purification material;
b) the first and second purification materials are each in porous form;
c) the amount of CXC present is sufficient to accomplish at least one of the following:
   i) a 6-log reduction in coliform bacteria *Escherishia coli* or *Klebsiella terrigena* for samples having $1 \times 10^7$ organisms/100 mL influent;
   ii) a 4-log reduction in process resistant viruses poliovirus 1 (LSc) or rotavirus (Wa or SA-11) for samples having $1 \times 10^7$ organisms/L influent;
   iii) a 3-log reduction in cysts *Giardia muris* or *Giardia lamblia*, for samples having a concentration in the range of $1 \times 10^6$ to $1 \times 10^7$ organisms/L influent; or
   iv) removal of inanimate particles of comparable size to any of those organisms to the same corresponding extent of multi-log reduction; and
d) the filtered fluid is essentially free of CXC.

2. The method of claim 1 wherein the rigorous filtration medium captures particles ≥0.2 microns in diameter.

3. The method of claim 1 wherein the fluid is a liquid selected from the group consisting of water, an aqueous solution, a mixture primarily comprising water and ethanol, blood, a bodily fluid other than blood, fermentation broth, and mixtures thereof.

4. The method of claim 1 wherein the fluid is a gas selected from the group consisting of air, oxygen gas, nitrogen gas, carbon dioxide, argon gas, nitrous oxide, an anesthetic gas other than nitrous oxide, and mixtures thereof.

5. The method of claim 1 wherein the fluid is an aqueous medium selected from the group consisting of potable water, a beverage, a recycle stream in a chemical process, a recycle stream in a cell culturing process, an aqueous solutions that has been used in a surgical procedure, and mixtures thereof.

6. The method of claim 1 wherein at least one of the first and second purification materials further comprises a binder therefor and is in the form of a porous block or porous sheet.

7. The method of claim 1, further comprising regeneration of the purification materials by exposure of the materials to a sterilization protocol comprising at least one of elevated temperature, elevated pressure, radiation, a chemical oxidant, a chemical reductant, electrochemical treatment, or a combination thereof.

8. A method for filtering an influent to remove any microorganisms therefrom, comprising causing the influent to flow through a first purification material comprising a chlorhexidine citrate (CXC) and a second purification material comprising a calcium phosphate compound, calcium carbonate and activated carbon, thereby obtaining filtered fluid, wherein:
a) the first and second purification materials are intermingled with one another in a composite form or the fluid flows through the first purification material before flowing through the second purification material;
b) the first and second purification materials are each in porous form;
c) the amount of CXC present is sufficient to accomplish at least one of the following:
   i) a 6-log reduction in coliform bacteria *E. coli* or *Klebsiella terrigena* for samples having $1 \times 10^7$ organisms/100 mL influent;
   ii) a 4-log reduction in process resistant viruses poliovirus 1 (LSc) or rotavirus (Wa or SA-11) for samples having $1 \times 10^7$ organisms/L influent;
   iii) a 3-log reduction in cysts *Giardia muris* or *Giardia lamblia*, for samples having a concentration in the range of $1 \times 10^6$ to $1 \times 10^7$ organisms per L influent; or
   iv) removal of inanimate particles of comparable size to any of those organisms to the same corresponding extent of multi-log reduction; and
d) the filtered fluid is essentially free of CXC.

9. The method of claim 8 wherein the second purification material is free from substances derived from bone charcoal.

10. The method of claim 8 wherein the calcium phosphate compound is present in a form that can adsorb a dissolved metal substance from the influent.

11. The method of claim 8 wherein the calcium phosphate compound is a hydroxyl apatite that is present in amorphous form in a purification material having a porosity of 200-800 microns in diameter.

12. The method of claim 8 wherein a calcium phosphate compound other than hydroxylapatite is present in a form selected from at least one of the following: in an admixture with CXC; in an admixture with hydroxylapatite; and downstream from CXC but not in an admixture with hydroxylapatite.

13. The method of claim 8 wherein the fluid is a liquid selected from the group consisting of water, an aqueous solution, a mixture primarily comprising water and ethanol, blood, a bodily fluid other than blood, fermentation broth, and mixtures thereof.

14. The method of claim 8 wherein the fluid is a gas selected from the group consisting of air, oxygen gas, nitrogen gas, carbon dioxide, argon gas, nitrous oxide, an anesthetic gas other than nitrous oxide, and mixtures thereof.

15. The method of claim 8 wherein the fluid is an aqueous medium selected from the group consisting of potable water, a beverage, a recycle stream in a chemical process, a recycle stream in a cell culturing process, an aqueous solutions that has been used in a surgical procedure, and mixtures thereof.

16. The method of claim 8 wherein at least one of the first and second purification materials further comprises a binder therefor and is in the form of a porous block or porous sheet.

17. The method of claim 8, further comprising regeneration of the purification materials by exposure of the materials to a sterilization protocol comprising at least one of elevated temperature, elevated pressure, radiation, a chemical oxidant, a chemical reductant, electrochemical treatment, or a combination thereof.

18. The method of claim 8, wherein the influent further comprises in a dissolved form at least one inorganic impurity selected from the group consisting of trivalent arsenic, pentavalent arsenic, hydrogen sulfide, iron, copper, zinc, lead, aluminum, chromium, uranium or a combination thereof, and wherein the filtered fluid has a reduced concentration of the inorganic impurity.

* * * * *